United States Patent
Smith et al.

(10) Patent No.: US 8,577,334 B1
(45) Date of Patent: Nov. 5, 2013

(54) RESTRICTED TESTING ACCESS FOR ELECTRONIC DEVICE

(75) Inventors: Nathan A. Smith, Olathe, KS (US); M. Jeffrey Stone, Overland Park, KS (US); Ryan A. Wick, Apollo Beach, FL (US)

(73) Assignee: Sprint Communications Company L.P., Overland Park, KS (US)

(*) Notice: Subject to any disclaimer, the term of this patent is extended or adjusted under 35 U.S.C. 154(b) by 180 days.

(21) Appl. No.: 13/161,496

(22) Filed: Jun. 16, 2011

(51) Int. Cl.
H04W 12/08 (2009.01)

(52) U.S. Cl.
USPC .............. 455/410; 455/412.2; 455/414.1

(58) Field of Classification Search
USPC ........ 455/410, 411, 412.1, 412.2, 414.1, 418, 455/419, 420
See application file for complete search history.

(56) References Cited

U.S. PATENT DOCUMENTS

| | | | |
|---|---|---|---|
| 5,950,200 A | 9/1999 | Sudai et al. | |
| 6,064,975 A | 5/2000 | Moon et al. | |
| 6,186,553 B1 | 2/2001 | Phillips et al. | |
| 6,356,838 B1 | 3/2002 | Paul | |
| 6,622,016 B1 | 9/2003 | Sladek et al. | |
| 6,978,132 B1 | 12/2005 | Sladek et al. | |
| 6,986,107 B2 | 1/2006 | Hanggie et al. | |
| 7,031,437 B1 | 4/2006 | Parsons et al. | |
| 7,072,653 B1 | 7/2006 | Sladek et al. | |
| 7,073,130 B2 | 7/2006 | Novak et al. | |
| 7,215,754 B1 | 5/2007 | Woodson et al. | |
| 7,260,382 B1 | 8/2007 | Lamb et al. | |
| 7,260,386 B1 | 8/2007 | Haldar et al. | |
| 7,500,198 B2 | 3/2009 | Mathews et al. | |
| 8,244,277 B1 | 8/2012 | Cha et al. | |
| 8,265,658 B2 | 9/2012 | Issa et al. | |
| 8,315,198 B2 | 11/2012 | Corneille et al. | |
| 2002/0029169 A1 | 3/2002 | Oki et al. | |
| 2002/0054086 A1 | 5/2002 | Van Oostenbrugge et al. | |
| 2002/0054150 A1 | 5/2002 | I'Anson et al. | |
| 2002/0101444 A1 | 8/2002 | Novak et al. | |
| 2002/0123335 A1 | 9/2002 | Luna et al. | |
| 2002/0167542 A1 | 11/2002 | Florin | |
| 2003/0233329 A1 | 12/2003 | Laraki et al. | |
| 2004/0044752 A1 | 3/2004 | Hamaguchi et al. | |
| 2004/0179034 A1 | 9/2004 | Burritt | |
| 2004/0181678 A1 | 9/2004 | Lee et al. | |
| 2004/0203941 A1 | 10/2004 | Kaplan et al. | |
| 2004/0216054 A1 | 10/2004 | Mathews et al. | |
| 2005/0071780 A1 | 3/2005 | Muller et al. | |
| 2005/0085272 A1 | 4/2005 | Anderson et al. | |

(Continued)

OTHER PUBLICATIONS

Annan, Brandon C., et al., Patent Application entitled, "Traffic Management of Third Party Applications", filed Jul. 31, 2012, U.S. Appl. No. 13/536,709.

(Continued)

*Primary Examiner* — Cong Tran

(57) ABSTRACT

A method of providing privileged access to an electronic device is provided. The method comprises receiving a first request for an activation code, where the first request comprises an identifier of the electronic device. An activation expiration time is determined by a computer system. An activation code is determined based on the identifier of the electronic device, and the activation code is transmitted. A second request for a token to unlock privileged access to the electronic device is received, where the second request comprises the activation code and the identifier of the electronic device. When the activation code received in the second request correlates with the identifier of the electronic device provided in the second request and when the second request is received before the activation expiration time, the token to unlock privileged access to the electronic device is transmitted.

18 Claims, 7 Drawing Sheets

(56) References Cited

U.S. PATENT DOCUMENTS

| | | | |
|---|---|---|---|
| 2006/0048141 | A1 | 3/2006 | Persson et al. |
| 2006/0085751 | A1 | 4/2006 | O'Brien et al. |
| 2006/0092861 | A1 | 5/2006 | Corday et al. |
| 2006/0258289 | A1 | 11/2006 | Dua |
| 2006/0277469 | A1 | 12/2006 | Chaudhri et al. |
| 2007/0067738 | A1 | 3/2007 | Flynt et al. |
| 2007/0265023 | A1 | 11/2007 | Bengtsson et al. |
| 2007/0268842 | A1 | 11/2007 | Wang |
| 2007/0282914 | A1 | 12/2007 | Sivapragasam et al. |
| 2008/0034309 | A1 | 2/2008 | Louch et al. |
| 2008/0092057 | A1 | 4/2008 | Monson et al. |
| 2008/0214172 | A1 | 9/2008 | Anwer |
| 2009/0017870 | A1 | 1/2009 | An |
| 2009/0077495 | A1 | 3/2009 | Bhat et al. |
| 2009/0181716 | A1 | 7/2009 | Benco et al. |
| 2009/0228824 | A1 | 9/2009 | Forstall et al. |
| 2010/0005196 | A1 | 1/2010 | Wolff-Petersen |
| 2010/0190478 | A1 | 7/2010 | Brewer et al. |
| 2010/0197219 | A1 | 8/2010 | Issa et al. |
| 2010/0234051 | A1 | 9/2010 | Holden et al. |
| 2010/0281427 | A1 | 11/2010 | Ghosh et al. |
| 2011/0161149 | A1 | 6/2011 | Kaplan |
| 2012/0102547 | A1 | 4/2012 | Fransdonk |

OTHER PUBLICATIONS

FAIPP Pre-Interview Communication dated Jul. 19, 2012, U.S. Appl. No. 13/018,083, filed Jan. 31, 2011.

Cha, Tae-Woo, et al., Patent Application entitled, "Device Experience Adaptation Based on Schedules and Events," filed Jun. 29, 2012, U.S. Appl. No. 13/537,563.

Ackerman, Samuel K., "Lecture Slides: Mapping User Interface Design to Culture Dimensions", Aaron Marcus and Associates, Inc., 2001.

Kenja's Newsletter, About Newsletter, http://kenja.net/news.main.html, printed from the World Wide Web, "last modified Fri, Oct. 10, 2003".

Openwave, "Comparison of WAP Push and Short Message Service (SMS)," Openwave Systems, Inc., Redwood City, CA, Apr. 2002.

QUALCOMM, uiOne™, http://brew.qualcomm.com/brew/in/about/uione.html.

Scansoft press release, "Scansoft Launches SpeechPAK Healthcare Suite 2.0", http://dragontranscription.com/press-release-articles-feburary-2005/scansoft-launches-speechpak-healthcare-suite-2.0.html, Feb. 17, 2005.

Stanford Technology Ventures Program, "Danger, Inc.: Powering the Next Generation of Mobile Technology", Oct. 15, 2003.

Office Action dated Apr. 15, 2008, U.S. Appl. No. 11/046,083, filed Jan. 28, 2005.

Final Office Action dated Oct. 28, 2008, U.S. Appl. No. 11/046,083, filed Jan. 28, 2005.

Office Action dated Aug. 15, 2011, U.S. Appl. No. 12/330,759, filed Dec. 9, 2008.

Office Action dated Apr. 3, 2008, U.S. Appl. No. 11/333,964, filed Jan. 17, 2006.

Final Office Action dated Oct. 8, 2008, U.S. Appl. No. 11/333,964, filed Jan. 17, 2006.

Final Office Action dated Jan. 21, 2009, U.S. Appl. No. 11/333,964, filed Jan. 17, 2006.

Advisory Action dated Apr. 13, 2009, U.S. Appl. No. 11/333,964, filed Jan. 17, 2006.

Office Action dated Jun. 23, 2009, U.S. Appl. No. 11/333,964, filed Jan. 17, 2006.

Final Office Action dated May 11, 2010, U.S. Appl. No. 11/333,964, filed Jan. 17, 2006.

Advisory Action dated Jul. 22, 2010, U.S. Appl. No. 11/333,964, filed Jan. 17, 2006.

Wolter, Eric, Patent Application entitled "Method and System for Calendar-Based Delivery of Themed User-Interface Skins," filed Dec. 9, 2008, U.S. Appl. No. 12/330,759.

Wolter, Eric S., Patent Application entitled "Method and System for Delivery of User-Interface Skins, Applications, and Services to Wireless Devices," filed Jan. 17, 2006, U.S. Appl. No. 11/333,964.

Katzer, Robin Dale, et al., Patent Application entitled "Zone Architecture for Dynamic Targeted Content Creation," filed Oct. 11, 2011, U.S. Appl. No. 13/271,207.

Hollister, Sean, "Apple patent app hints at iPod-based phones, Peel 520 turns shades of green, red, blue and yellow," Engadget, http://www.engadget.com/2010/09/19/apple-patent-app-hints-at-ipod-based-phones-peel-520-turns-shad/, Sep. 19, 2010, p. 1.

Delker, Jason R., et al., Patent Application entitled "Provisioning System and Methods for Interfaceless Phone," filed Sep. 6, 2010, U.S. Appl. No. 12/876,220.

Delker, Jason R., et al., Patent Application entitled "System and Method for ID Platform," filed Feb. 8, 2011, U.S. Appl. No. 13/023,486.

Delker, Jason R., et al., Patent Application entitled "Dynamic Loading, Unloading, and Caching of Alternate Complete Interfaces," filed Sep. 6, 2010, U.S. Appl. No. 12/876,221.

Delker, Jason R., et al., Patent Application entitled "Shared ID with Second Party," filed Jan. 31, 2011, U.S. Appl. No. 13/018,083.

Delker, Jason R., et al., Patent Application entitled "Extending ID to a Computer System," filed May 27, 2011, U.S. Appl. No. 13/118,058.

Davis, John M., et al., Patent Application entitled "Mirroring Device Interface Components for Content Sharing," filed Mar. 10, 2011, U.S. Appl. No. 13/045,292.

Cha, Tae-Woo, et al., Patent Application entitled "Device Experience Adaptation Based on Schedules and Events," filed Feb. 16, 2011, U.S. Appl. No. 13/029,103.

Delker, Jason R., et al., Patent Application entitled "Ad Sponsored Communication Pack," filed Feb. 18, 2011, U.S. Appl. No. 13/031,123.

Office Action—Restriction Requirement dated Feb. 1, 2012, U.S. Appl. No. 12/876,221, filed Sep. 6, 2010.

First Action Interview Pre-Interview Communication dated Apr. 24, 2012, U.S. Appl. No. 12/876,220, filed Sep. 6, 2010.

FIAPP Office Action dated May 10, 2012, U.S. Appl. No. 12/876,221, filed Sep. 6, 2010.

Notice of Allowance dated Mar. 30, 2012, U.S. Appl. No. 13/029,103, filed Feb. 16, 2011.

Pre-Interview Communication dated Feb. 26, 2013, U.S. Appl. No. 13/023,486, filed Feb. 8, 2011.

Final Office Action dated Jan. 11, 2013, U.S. Appl. No. 12/876,221, filed Sep. 6, 2010.

Pre-Interview Communication dated Feb. 26, 2013, U.S. Appl. No. 13/118,058, filed May 27, 2011.

Delker, Jason R., et al., Patent Application entitled "Transition Experience During Loading and Updating an Interface and Applications Pack," filed Oct. 24, 2012, U.S. Appl. No. 13/659,889.

Notice of Allowance dated Jun. 4, 2013, U.S. Appl. No. 13/023,486, filed Feb. 8, 2011.

Advisory Action dated Apr. 23, 2013, U.S. Appl. No. 12/876,221, filed Sep. 6, 2010.

Notice of Allowance dated Jul. 2, 2013, U.S. Appl. No. 12/876,221, filed Sep. 6, 2010.

Final Office Action dated May 10, 2013, U.S. Appl. No. 13/018,083, filed Jan. 31, 2011.

First Action Interview Office Action dated May 6, 2013, U.S. Appl. No. 13/118,058, filed May 27, 2011.

Notice of Allowance dated Apr. 29, 2013, U.S. Appl. No. 13/537,563, filed Jun. 29, 2012.

RESTRICTED TESTING ACCESS FOR ELECTRONIC DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices used for mobile voice or data communication based on network connectivity provided by base stations known as cell towers or sites. In addition to the standard voice function of a mobile telephone, current mobile phones and other similar portable electronic devices may support additional services including short message service (SMS) for text messaging, electronic mail, and packet switching for access to the Internet.

SUMMARY

In an embodiment, a method of providing privileged access to an electronic device is disclosed. The method comprises receiving a first request for an activation code, where the first request comprises an identifier of the electronic device. An activation expiration time is determined by a computer system. An activation code is determined based on the identifier of the electronic device, and the activation code is transmitted. A second request for a token to unlock privileged access to the electronic device is received, where the second request comprises the activation code and the identifier of the electronic device. When the activation code received in the second request correlates with the identifier of the electronic device provided in the second request and when the second request is received before the activation expiration time, the token to unlock privileged access to the electronic device is transmitted.

In an embodiment, a method of providing privileged access to an electronic device is disclosed. The method comprises the electronic device receiving a first message comprising a uniform resource locator (URL) and an activation code. At least a portion of the first message is presented by the electronic device. An input is received by the electronic device selecting the uniform resource locator. The uniform resource locator is analyzed by the electronic device. Based upon the analysis of the uniform resource locator, the electronic device executes an access mediation application that consumes the uniform resource locator. The activation code and an identity of the electronic device are transmitted by the electronic device. A second message is received by the electronic device, the second message comprising at least one access permission. An input selecting a user interface control is received. In response to receiving the input selecting the user interface control and based on the at least one access permission, the access mediation application comparing the current time to an expiration time and when the current time is not past the expiration time, a user interface control is presented to access privileged functions of the electronic device.

In an embodiment, a mobile phone is disclosed. The mobile phone comprises an antenna, a radio transceiver coupled to the antenna, a processor, a user interface coupled to the processor, a memory, and an application stored in the memory. The application receives a first message comprising a uniform resource locator (URL) and an activation code. An input is received via the user interface selecting the uniform resource locator. The uniform resource locator is analyzed by the application. Based upon the analysis of the uniform resource locator, the application consumes the uniform resource locator. The activation code and an identity of the electronic device are transmitted via the radio transceiver. A second message is received via the radio transceiver comprising at least one access permission. An input selection is received via the user interface control. In response to receiving the input selection and based on the at least one access permission, the application compares the current time to an expiration time. When the current time is not past the expiration time, via the user interface, an interface control is presented by the application to access privileged functions of the electronic device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
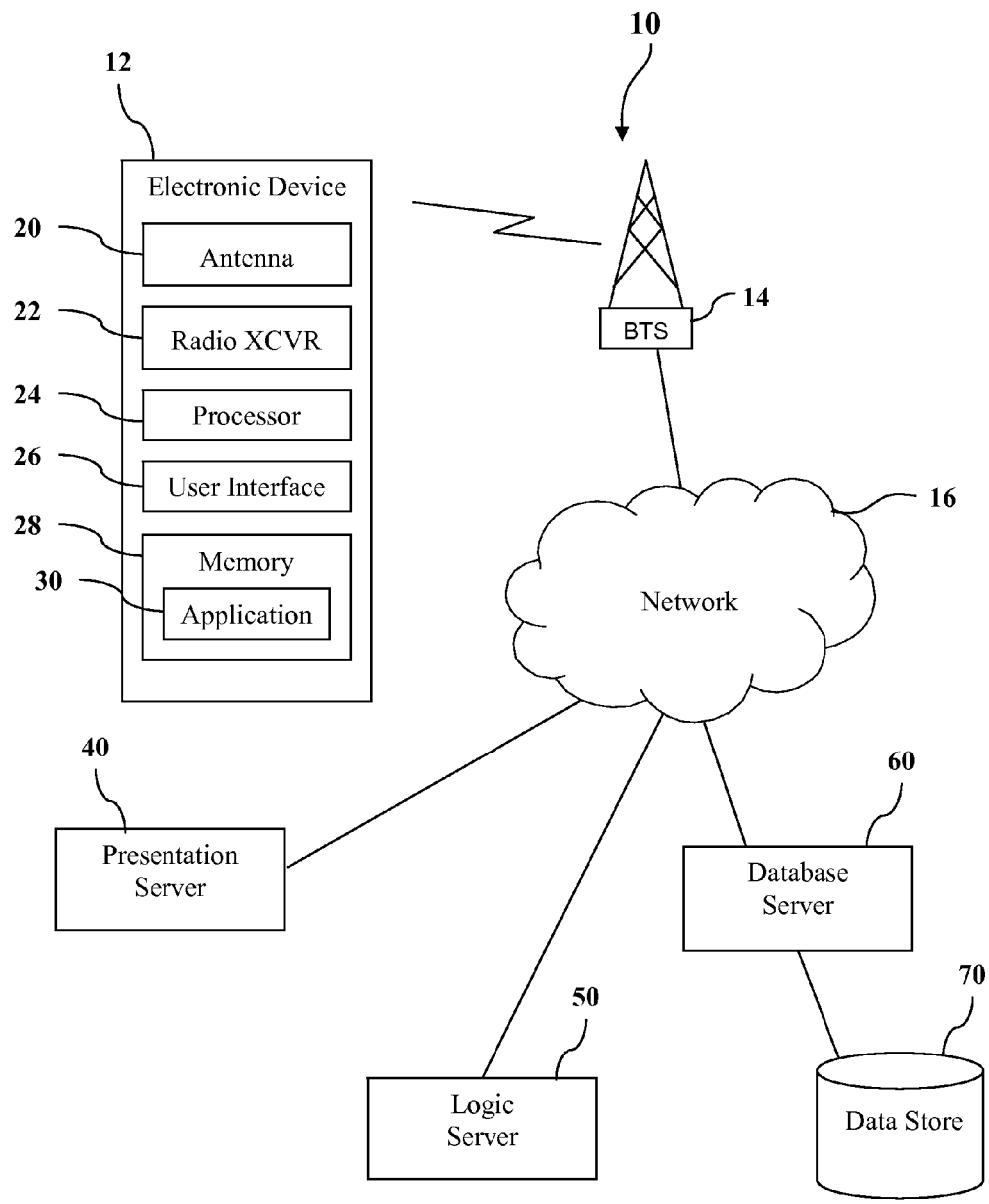
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A method of providing privileged access to an electronic device is described. An electronic device may be delivered with embedded or built in software designed to perform one or more dedicated functions. The embedded software may interface with additional software applications installed on the electronic device but not considered part of the embedded software. The interface with the embedded software may be locked down by the electronic device vendor to ensure operational reliability and to allow the vendor to control delivery of products and services. Locking down an electronic device may entail preventing the addition of new software except through approved means which can be controlled by the vendor. For example, the vendor may only allow applications to be installed through an application marketplace run by the vendor, where applications are approved by the vendor prior to being listed in the marketplace and are downloaded from the vendor's servers.

The activity of testing new products and services may be facilitated by the ability to unlock the electronic device and enter developer mode, providing a means to install new software outside of the normal vendor production environment. This could be accomplished by delivering a version of the embedded software which allows the ability to sideload files or applications onto the electronic device. Sideloading is a term typically used to refer to transferring files to an electronic device via universal serial bus (USB) or via a Bluetooth wireless protocol or transferring files to the electronic device from a memory card inserted into the device. The risk is that the sideload version of the embedded software will get out to the public and become a security issue for the vendor.

To mitigate the risk of open access to the electronic device software, a secure method to unlock the electronic device is presented. A developer wishing to install and test software on the electronic device may initiate an unlock request to the electronic device vendor. The developer would have an account with the vendor with access privileges and device information retained by the vendor for purposes of validating a request to unlock the electronic device. Upon receiving the unlock request from the developer, the vendor would validate the developer and check if they have sufficient permissions to unlock the electronic device. Upon verifying the developer and their access privileges, the vendor may reply to the unlock request by sending a message containing an activation code to the electronic device registered to the developer. The activation code may be contained within a uniform resource locator (URL), where the uniform resource locator may be known and configured in the electronic device software as associated with an application. When the developer selects the uniform resource locator the application on the electronic device is executed. By default, the electronic device may execute a web browser to process uniform resource locators, but when the known uniform resource locator is selected the electronic device will instead execute the application. The application consumes the activation code contained within the uniform resource locator and connects to a static defined server. The application passes the activation code and the electronic device identification to the server for validation. If the activation code is still valid and has not expired, and the electronic device identification matches the device registered for the developer, the server responds with the unlock permissions for the developer. Privileged menu selections are then available and privileged functions enabled through the menus. Prior to receiving the permissions, the functionality was present on the electronic device but was inaccessible. The developer permissions may be stored in an encrypted data store on the electronic device and include an expiration timer. When the developer attempts to access the developer menu in the user interface of the electronic device, the expiration of the access is checked, and if not expired the different permissions are checked to see which menus to show. The developer may have the ability to load a file from a media card or from an external source identified by a uniform resource locator depending on the access permissions granted.

Turning now to FIG. 1, a system 10 is presented. The system 10 comprises an electronic device 12, a base transceiver station 14, a network 16, a presentation server 40, a logic server 50, a database server 60, and a database 70. The electronic device 12 comprises an antenna 20, a radio transceiver 22 coupled to the antenna 20, a processor 24, a user interface 26 coupled to the processor 24, a memory 28, and an application 30 stored in the memory 28. The servers 40, 50, 60 may be implemented as one or more computer systems. Computer systems are discussed in more detail hereinafter. In an embodiment, the functionality of two or more of the servers 40, 50, 60 may be combined in a single server. In an embodiment, the functionality described as being provided by one of the servers 40, 50, 60 may be provided by two or more servers.

The electronic device 12, while shown as a mobile phone, may be a personal digital assistant (PDA), a media player, or other electronic device. The base transceiver station 14 provides a communication link to the device 12 and couples the device 12 to the network 16. In an embodiment, the base transceiver station 14 provides a wireless communication link to the electronic device 12 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol.

While a single base transceiver station 14 is illustrated in FIG. 1, it is understood that the system 10 may comprise any number of base transceiver stations 14 and any number of electronic devices 12. The electronic device 12 also may establish a wireless communication link to the network 16 using Wi-Fi or Bluetooth wireless protocols. The network 16 may be a public communication network, a private communication network, or a combination thereof. The presentation server 40 supports a web server to provide the user interface to client applications requesting access to unlock their electronic device 12. The logic server 50 controls the functionality of the access and authentication process by performing the detailed processing. The logic server 50 makes logical decisions and evaluations based on the business rules defined for the access and authentication process and moves data between the database server 60 and the server applications to store and later access the data for use. The database server 60 controls the storage and retrieval of data from the data store 70. While the system 10 presents each of these functions on its own server, in other embodiments the functionality could be combined on one single server or two servers, or could be spread across additional servers to support higher loads.

When a user wants to enter developer mode on their electronic device 12 to install and test new software, they may visit a vendor web site to request to unlock their electronic device 12. The vendor web site runs on the presentation server 40, which collects the user login information and electronic device 12 identification and sends the collected information to the logic server 50. The logic server 50 then validates the user information and after confirming the user may be granted an unlock of their electronic device 12, the logic server 50 computes an activation code for the unlock request and sends the activation code, the electronic device 12 identification, the user permissions, and an expiration time for the activation code to the database server 60. The database server 60 stores the information from the logic server 50 in the data store 70 for future access. The logic server 50 sends a first message to the electronic device 12 with a well known uniform resource locator which contains the activation code.

If the user selects the uniform resource locator, the application 30 is executed by the processor 24 of the electronic device 12. The application 30 is defined in the software of the electronic device 12 to be executed in place of the web browser when the well known uniform resource locator is selected. The application 30 parses the activation code out of the uniform resource locator and connects to the logic server 50, passing the logic server 50 the activation code and the identification of the electronic device 12 via the radio transceiver 22. The logic server 50 confirms that the identification of the electronic device 12 and activation code match and that the activation code has not expired or previously been used. The logic server 50 responds by retrieving the access permissions stored in the data store 70 via the database server 60 and sending the access permissions to the application 30 in a second message. The application 30 receives an input selection via the user interface 26 of the electronic device 12, and based on the input selection and the access permissions, the application 30 compares the current time to an expiration time which was included with the permissions received in the second message. When the current time is not past the expiration time the application 30 presents via the user interface 26 an interface control to access privileged functions of the electronic device 12. If the timer is not expired the permissions are checked to see which menus to show in the user interface 26.

In an embodiment, the application 30 saves the access permissions in the memory 28 after the second message is received and when the current time is past the expiration time and the input selection is received, the application 30 deletes the at least one access permission from the memory 28. The permissions may be stored in an encrypted data store on the electronic device 12, including a timer value for when the access permissions expire. If the user tries to access the developer menu in the user interface 26 on the electronic device 12, the expiration timer is checked and if expired, the access permissions in the data store on the electronic device 12 are deleted to ensure the data in the data store can't be altered to enable access. Permissions may comprise one or more of load file from media card, load file via uniform resource locator, edit uniform resource locator, and test uniform resource locator. If the permission was set to allow editing the uniform resource locator, the user can edit this value to specify where to retrieve the file, otherwise they may be restricted to use of the predefined uniform resource locator associated with their account and stored on the database server 60 in the data store 70.

In an embodiment, the privileged functions allow loading an interface and applications pack (IAP) into the memory 28. An interface and applications pack (IAP) comprises at least one of a media file, an application, a web widget, and a network service and may be used to customize the communication experience of using an electronic device. In an embodiment, the interface and applications pack comprises at least two of these enumerated elements. In another embodiment, the interface and applications pack comprises at least three of these enumerated elements. An interface and applications pack may be viewed as an aggregated set of applications, network services, widgets, ring tones, ringback tones, wallpapers, and other content targeted for the electronic device. In some contexts, the interface and applications pack may be referred to as an ID pack.

As an example, but not by way of limitation, an interface and applications pack may be produced by an enterprise such as a retail outlet or a media business to promote its business interests to wireless communication service subscribers. The interface and applications pack, when active on an electronic device, may provide a control to select a store mapping web widget that provides a map of the location of products within a retail store, where the map of the store is dynamically downloaded by the web widget based on a physical location of the mobile device and based on known locations of the retail stores operated by the enterprise. The map web widget may provide a control to select a search utility for finding the location of a specific product within a store.

The interface and applications pack may provide an application that automatically generates an electronic coupon and posts a notification about the coupon in a notifications display area of an electronic device. The application may generate the coupon and post the related notification based on determining that the physical location of the electronic device is in the proximity of a known retail store operated by the enterprise. Alternatively, the application may generate the coupon based on the passage of a period of time without the subscriber of the electronic device making a purchase from the enterprise and based on the day of the week, for example a Saturday when the subscriber of the electronic device has most often made purchases from the enterprise in the past. In an embodiment, the application may determine when the electronic device is in a retail store operated by the enterprise, establish a communication link with a corresponding application executing on a server in the retail store, and receive information about purchases made by the subscriber of the electronic device. This purchase information may be used in the process of generating coupons described above.

The interface and applications pack may provide controls to access a network application that promotes participation in relevant social media, for example to participate in a home improvement discussion forum sponsored by the subject retail store, to post photographs of home improvement projects the user has completed, and to post descriptions of the materials used and/or innovations applied to overcome peculiar problems. The interface and applications pack may provide controls to select videos posted to the home improvement social media site, for example video showing fundamental techniques of using tools. The interface and applications pack may provide media files that define wall papers and themes that change the look and sounds of the electronic device. For example, the interface and application pack may include an audio file that defines an aural alert associated with receiving a short message service (SMS) message that is the sound of hammering. For example, the interface and application pack may include a picture file that defines the background of the display of the electronic device to be a photographic view of picturesque mountains seen through a 2×4 frame structure for a storage shed. These examples are provided to suggest the scope and power of the ID pack construct, but it is understood that a great variety of implementations of the ID pack are contemplated by the present disclosure.

The interface and applications pack further comprises an automatic self-installation routine that provides a user-friendly means to "stand up" the interface and applications pack for the electronic device. The self-installation routine downloads applications, widgets, ring tones, wallpapers, and other content to the electronic device. The self-installation routine may include instructions to automatically configure the device's home screens such as shortcuts, bookmarks, and widget placement. The self-installation routine may execute partly in the network to provision and/or initialize network services, ringback tones, and other network provided functionality associated with the interface and applications pack. The self-installation routine, for example, may initialize and/or provision voice-mail changes.

An interface and applications pack may be tested to assure that the aggregation of applications, widgets, network services, ring tones, ringback tones, wallpapers, and other content interact appropriately with each other and do not impair other functionality of the electronic device. In an embodiment, the service provider may impose a constraint that interface and applications packs be provided to the electronic device from a controlled content source so that the service provider can exercise oversight and quality control of interface and applications packs. For further details about interface and applications packs, see U.S. patent application Ser. No. 12/876,220, filed Sep. 6, 2010, entitled "Provisioning System and Methods for Interfaceless Phone," by Jason R. Delker, et al.; U.S. patent application Ser. No. 13/023,486, filed Feb. 8, 2011, entitled "System and Method for ID Platform," by Jason R. Delker, et al.; U.S. patent application Ser. No. 12/876,221, filed Sep. 6, 2010, entitled "Dynamic Loading, Unloading, and Caching of Alternate Complete Interfaces," by Jason R. Delker, et al.; U.S. patent application Ser. No. 13/018,083, filed Jan. 31, 2011, entitled "Shared ID with Second Party," by Jason R. Delker, et al.; U.S. patent application Ser. No. 13/031,123, filed Feb. 18, 2011, entitled "Ad Sponsored Communication Pack," by Jason R. Delker, et al.; and U.S. patent application Ser. No. 13/118,058 filed May 27, 2011, entitled "Extending ID to a Computer System," by Jason R. Delker, et al., all of which are incorporated by reference in their entirety.

The application 30 may be an ID application used to select and apply different identity and applications packs installed on the electronic device 12. The application 30 also may provide the ability to download new interface and applications packs from a location controlled by the electronic device 12 vendor. A developer may be creating a new interface and applications pack and may need testing access to the electronic device 12 to install his new interface and applications pack from a location that differs from the production location defined in the application 30. The access permissions on the electronic device 12 may enable access to privileged menu selections in the application 30 which allow the developer to install an interface and applications pack off a media card and save it to the memory 28 of the electronic device 12. The permissions also may be extended to restrict installation and testing to specific interface and applications packs rather than all files on a media card or referenced by a uniform resource locator.

Figure 2:
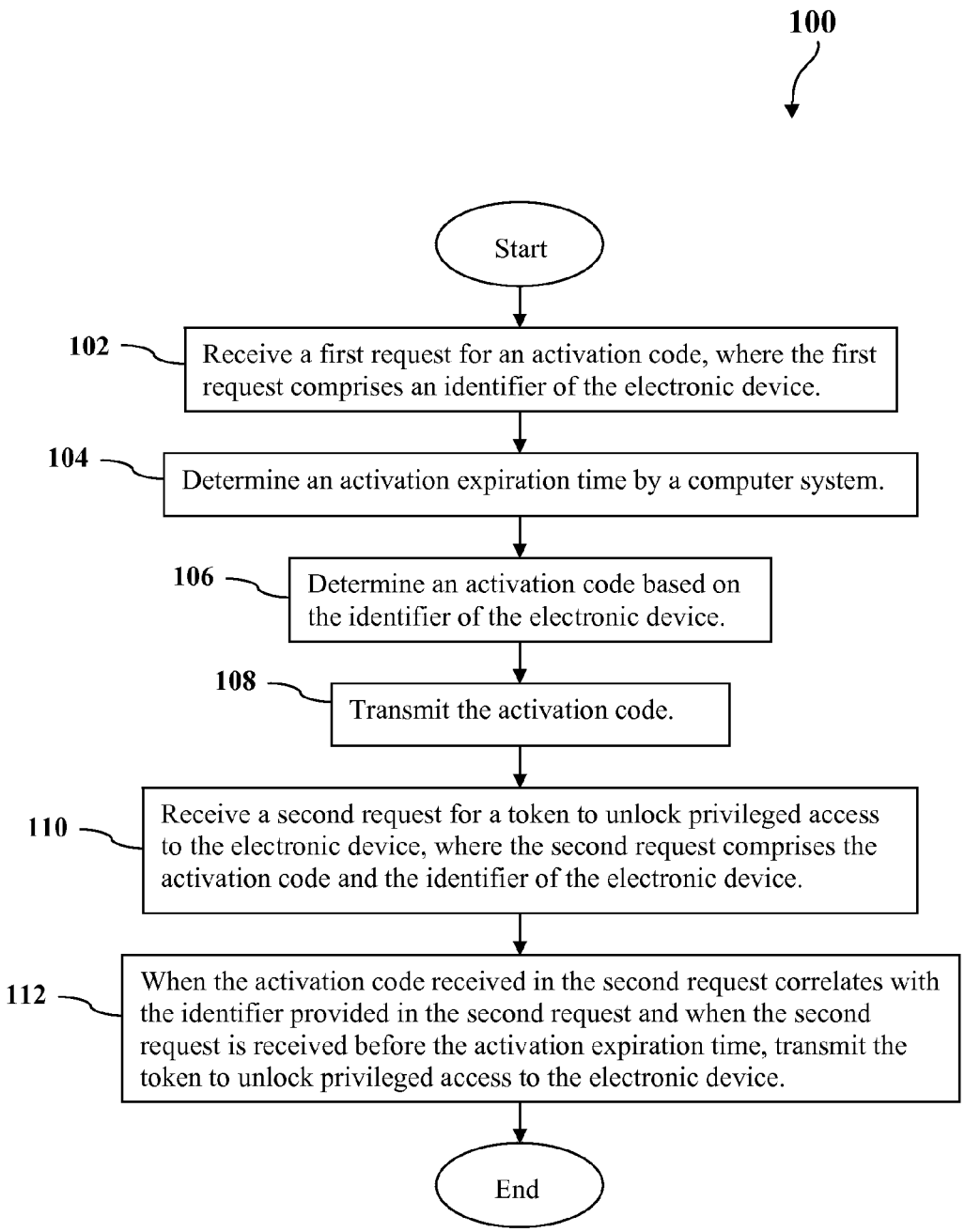
FIG. 2 is a flow chart of a method according to an embodiment of the disclosure.

Turning now to FIG. 2, a method 100 of providing privileged access to an electronic device is described. At block 102, a first request for an activation code is received, where the first request comprises an identifier of the electronic device. At block 104, an activation expiration time is determined by a computer system. The expiration time will limit the amount of time the user has to activate the privileged access on the electronic device once they have requested the activation code, for example the user may have one hour to use the activation code once requested or else they will have to begin the process again. At block 104, an activation code is determined based on an identifier of the electronic device. The activation code is unique to the electronic device identifier and only may be used on the electronic device associated with the developer account used to request the activation code. At block 106, the activation code is transmitted. At block 108, a second request is received for a token to unlock privileged access to the electronic device, where the second request comprises the activation code and the identifier of the electronic device. The activation code and identifier of the electronic device provided by the second request can be used to verify the authenticity of the second request. At block 110, when the activation code received in the second request correlates with the identifier provided in the second request and when the second request is received before the activation expiration time, the token to unlock privileged access is transmitted to the electronic device. The activation code is confirmed to match the electronic device identifier and the second request is checked to ensure it is received before the activation code expires. When both of these conditions are true, the token to unlock privileged access is sent to the electronic device.

In an embodiment, determining the activation code comprises processing the identifier of the electronic device with a shared private key. A shared private key represents a shared secret between two or more parties, in this case the electronic device and the computer system controlling privileged access to the electronic device. In an embodiment, the activation expiration time is less than two hours. A short expiration time for the activation code enhances the security of the process by reducing the duration of time an unauthorized attempt to utilize or hack the authorization code could be attempted.

In an embodiment, transmitting the activation code comprises transmitting the activation code to the electronic device based on the identifier of the electronic device. The request for the activation code may come via a web site interface. To provide a more secure transaction, the computer system transmits the activation code directly to the electronic device over a separate communication mechanism as opposed to providing the activation code in a web page, where the electronic device identifier is used in establishing this communication. In an embodiment, the identifier of the electronic device comprises one of a phone number, an electronic serial number (ESN), or a mobile subscriber identity (MSID). The phone number, electronic serial number, or mobile subscriber identity are unique identifiers attached to a specific electronic device and are used to ensure access is only granted to the correct device. Other unique identifiers of the electronic device may also be used.

In an embodiment, the method 100 further comprises determining if the activation code has been previously used to request the token to unlock the privileged access, where transmitting the token to unlock privileged access to the electronic device is further conditioned on the absence of a previous use of the activation code. The activation code only may be used once to unlock privileged access to the electronic device, and any subsequent attempt to use the same activation code will not result in transmitting an unlock token.

In an embodiment, an access category is determined based on one of the identifier of the electronic device and an identity of an organization, where the token to unlock privileged access identifies the access category. Access permissions for the electronic device will be stored and provided to the electronic device as part of the token to unlock privileged access. The permissions may be based upon the identifier of the electronic device, or alternatively they may be based on an identity of an organization. A large development organization may have many electronic devices associated with their organization along with processes in place to allow secure access to files on an internal uniform resource locator, and therefore may be granted an access category allowing loading files from the internal uniform resource locator. Additionally, a larger organization may have more defined development processes in place and may be given greater access based on trust in the organization's reliability and execution. In contrast, an individual developer may only have a single electronic device authorized for privileged access based on the identifier of the electronic device and may be considered less reliable than a larger organization, and their access category may only allow for loading files from a media card attached to the electronic device.

Figure 3:
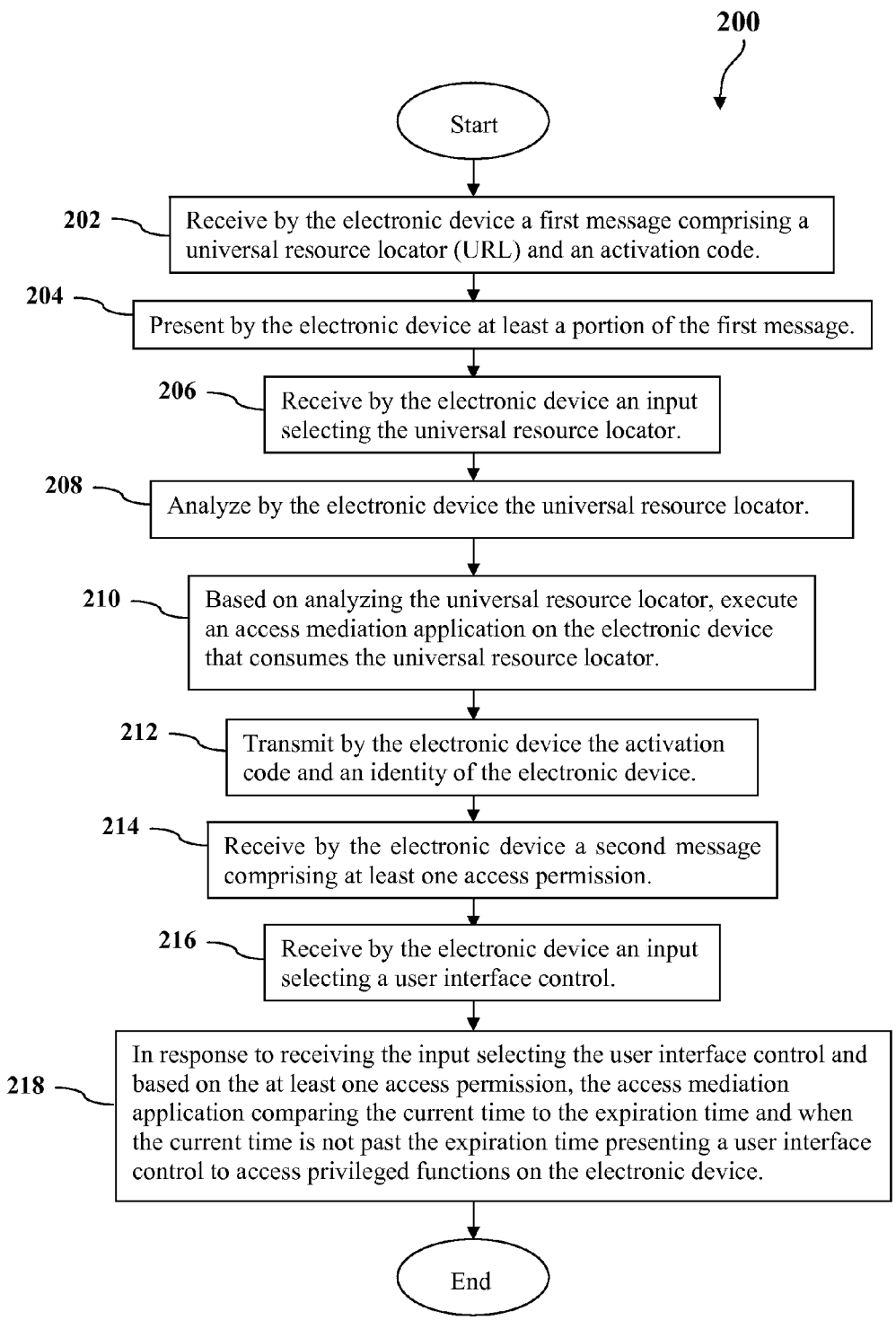
FIG. 3 is a flow chart of a method according to an embodiment of the disclosure.

Turning now to FIG. 3, a method 200 of providing privileged access to an electronic device is described. At block 202, a first message is received by the electronic device, the first message comprising a uniform resource locator (URL) and an activation code. The uniform resource locator specifies where to transmit the activation code to request a token to unlock privileged access to the electronic device. At block 204, at least a portion of the first message is presented by the electronic device. The electronic device displays the first message to alert the user that the activation code has been received. At block 206, an input selecting the uniform resource locator is received by the electronic device. For example, the user sees the first message displayed on the electronic device and uses the user interface of the electronic device to select the uniform resource locator in the message. At block 208, the uniform resource locator is analyzed by the electronic device. The electronic device may have defined actions for processing uniform resource locators and will determine which program to execute for the uniform resource locator received in the first message. At block 210, based on analyzing the uniform resource locator, an access mediation application is executed on the electronic device that consumes the uniform resource locator. The uniform resource locator is well known and has been registered on the electronic device to be handled by the access mediation application instead of the web browser. At block 212, the activation code and an identity of the electronic device is transmitted by the electronic device. The access mediation application transmits the activation code and the identity of the electronic device to the address specified by the uniform resource locator.

At block 214, a second message is received by the electronic device, the second message comprising at least one access permission. At block 216, an input selecting a user interface control is received by the electronic device. The user selects a user interface control to load new files to the electronic device. At block 218, in response to receiving the input selecting the user interface control and based on the at least one access permission, the access mediation application comparing the current time to the expiration time, and when the current time is not past the expiration time, a user interface control is presented to access privileged functions on the electronic device. The access mediation application checks the expiration time of the access permissions and if the permissions have not expired the appropriate user interface control corresponding to the access permissions is displayed.

In an embodiment, the electronic device is one of a mobile phone, a personal digital assistant (PDA), and a media player. A mobile phone service provider may utilize the method 200 to control content being added to the mobile phone, requiring users to access the providers own portal to add new software and content. In an embodiment, the identity of the electronic device is one of a phone number, an electronic serial number (ESN), and a mobile subscriber identity (MSID). A phone number, an electronic serial number, and a mobile subscriber identity are all unique ways to identify a mobile phone. This unique identity may be employed by the method 200 to provide secure privileged access only to a specific device identified in the request and to prevent sharing of activation codes among multiple mobile phones.

In an embodiment, the method 200 further comprises storing the at least one access permission and the expiration time in a memory of the electronic device. When the current time is past the expiration time the at least one access permission is deleted from the memory of the electronic device. Storing the access permission and expiration time in the memory of the electronic device allows the device to control access to the privileged functions when no communication link is available to the network. Network access is only needed during the activation process. Once the permissions have been stored on the electronic device, the device can manage the access until the permissions expire, at which point the electronic device will delete the access permission from the memory of the device. Deletion of the access permission is triggered when an attempt to access the privileged menu occurs after the expiration time. In an embodiment, the access permission is encrypted based on the identity of the electronic device and a shared private key, and storing the access permission in the memory of the electronic device comprises storing the encrypted access permission in the memory of the electronic device. The shared private key may be based on the identity of the electronic device, and prevents the data from being copied and used on another electronic device.

In an embodiment, where the privileged access enables loading an interface and applications pack into the memory of the electronic device, the method 200 also comprises deleting the contents of the interface and applications pack from the electronic device from the memory may be triggered when the current time is past the expiration time. The interface and applications pack comprises two or more of a media file, an application, and a web widget. Further, the interface and applications pack comprises a self-installation and/or an automated installation routine. As used herein, an interface and applications pack or ID pack is understood to provide, when installed on the electronic device, a user experience including access to different applications and web widgets as well as distinctive alerting tones and graphical content, as described more fully above. The interface and applications pack is experienced, at one level of abstraction, as a unity. For example, when an end user selects an interface and applications pack for installation on the electronic device, the interface and applications pack, for example the automated installation routine, collects the various components of the interface and applications pack from various sources, installs them on the electronic device, and adapts any device settings that may need changing. This process of installing the interface and applications pack may further involve modifying or configuring settings outside of the electronic device in the network, for example voice mailbox settings.

A developer may test a new interface and applications pack prior to making it available in a production environment. Testing may verify that the new interface and applications pack interoperates with standard hardware components, standard firmware, and/or standard applications of the electronic device. Testing in the production environment may expose the new interface and applications pack to other users for download prior to all software bugs being removed. The privileged access allows the means to install and store the interface and applications pack into the memory of the electronic device for testing, bypassing the production delivery system. When the privileged access expires, not only do the permissions get deleted from the electronic device, but also the interface and applications pack that was installed for testing.

In an embodiment, where the at least one access permission identifies an access category, the access mediation application enables privileged downloading from a computer system external to the electronic device for a first access category, and the access mediation application enables privileged downloading from a media card connected to the electronic device and prohibits privileged downloading from a computer system external to the electronic device for a second access category. The first access category may be enabled for a larger organization, allowing them to set up a download server for their developers to access from the electronic device when installing a file for testing. An individual developer may be granted the second access category, being allowed to sideload, or download from a media card connected to the electronic device, but prohibited from any access to an external computer system.

In an embodiment, the expiration time is determined by the electronic device after receiving the second message. The electronic device analyzes the second message and determines the expiration time based on the contents. In an embodiment, the expiration time is determined based on the access category. Different access categories may be assigned different expiration times. For example, permissions for loading from a media card may expire after two days, while permissions for loading from a computer system external to the electronic device may expire after one week. In an embodiment, the second message further comprises the expiration time. The expiration time may be included in the second message along with the access permissions, and parsed out of the second message by the electronic device.

Figure 4:
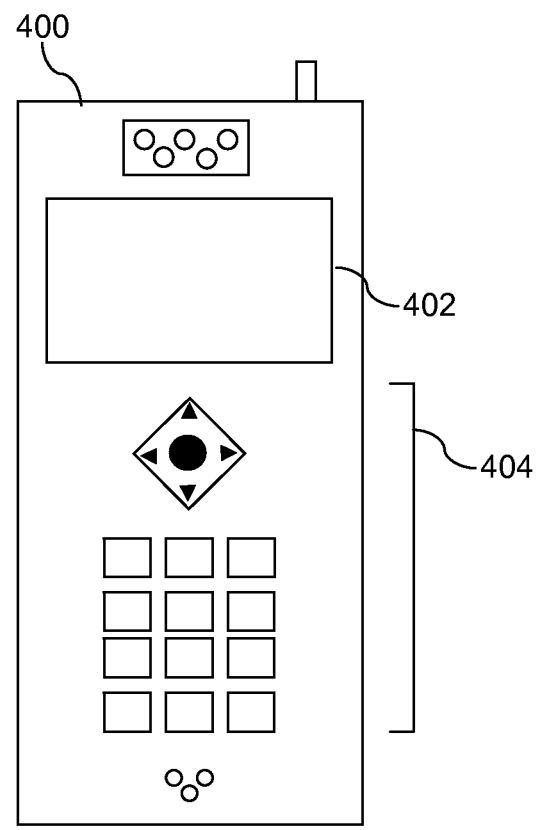
FIG. 4 is an illustration of a mobile device according to an embodiment of the disclosure.

FIG. 4 shows a wireless communications system including a mobile device 400. FIG. 4 depicts the mobile device 400, which is operable for implementing aspects of the present disclosure, for example for implementing the electronic device 12, but the present disclosure should not be limited to these implementations. Though illustrated as a mobile phone, the mobile device 400 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 400 is not a general purpose computing device like a portable, laptop or tablet computer, but rather is a special-purpose communications device such as a mobile phone, wireless handset, pager, or PDA. The mobile device 400 may support specialized activities such as gaming, inventory control, job control, and/or task management functions, and so on.

The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400.

Figure 5:
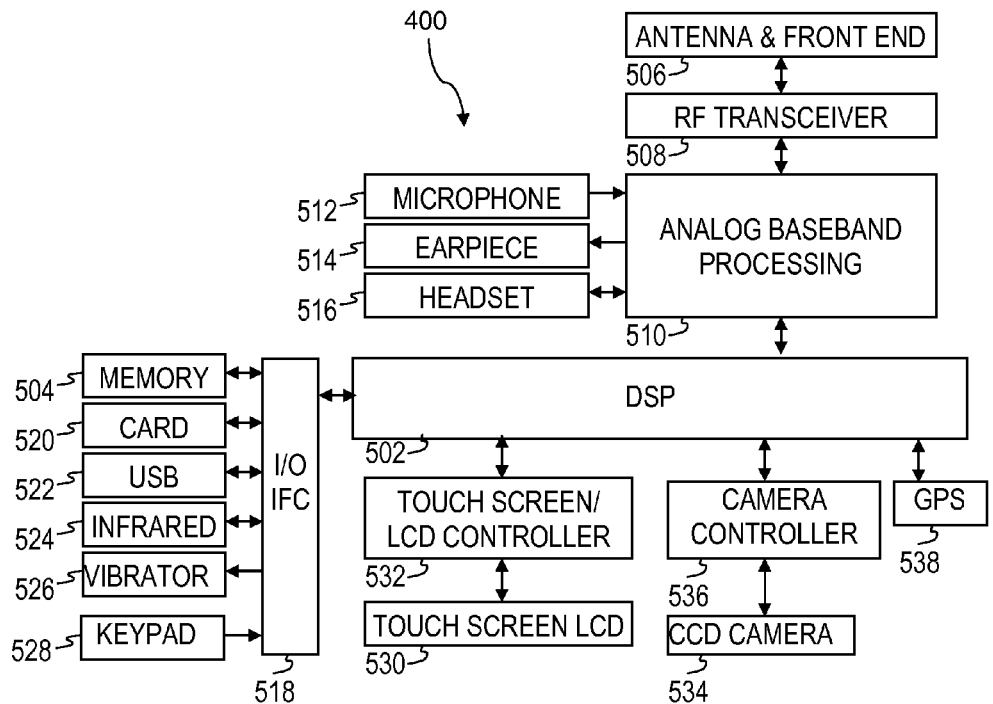
FIG. 5 is a block diagram of a mobile device according to an embodiment of the disclosure.

FIG. 5 shows a block diagram of the mobile device 400. While a variety of known components of handsets 400 are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 400 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 400 to send and receive information from a radio access network (RAN) or some other available wireless communications network or from a peer mobile device 400. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 400 to be used as a mobile phone. The analog baseband processing unit 510 further may include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The input/output interface 518 may further connect the DSP 502 to the vibrator 526 that, when triggered, causes the mobile device 400 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530.

The CCD camera 534 enables the mobile device 400 to take digital pictures. The DSP 502 communicates with the CCD camera 534 via the camera controller 536. The GPS sensor 538 is coupled to the DSP 502 to decode global positioning system signals, thereby enabling the mobile device 400 to determine its position. In another embodiment, a camera operating according to a technology other than charge coupled device cameras may be employed. Various other peripherals may also be included to provide additional functions, e.g., radio and television reception.

Figure 6A:
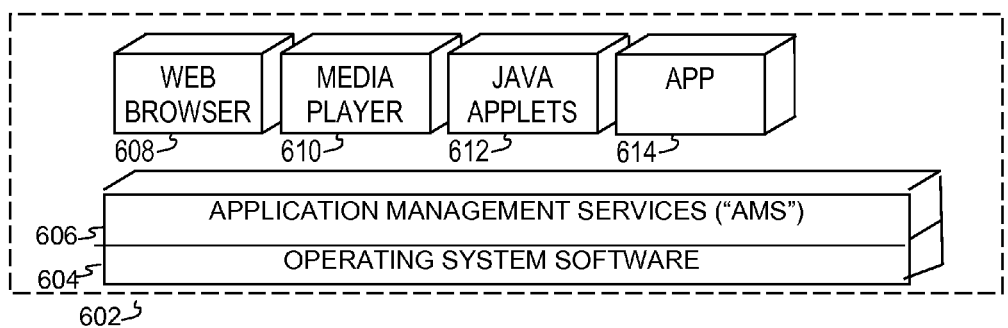
FIG. 6A is a block diagram of a software architecture for a mobile device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 400. Also shown in FIG. 6A are a web browser application 608, a media player application 610, JAVA applets 612, and an application 614. The web browser application 608 configures the mobile device 400 to operate as a web browser, allowing a user to enter information into forms and select links to retrieve and view web pages. The media player application 610 configures the mobile device 400 to retrieve and play audio or audiovisual media. The JAVA applets 612 configure the mobile device 400 to provide games, utilities, and other functionality. The application 614 may be an application configuring the device for a specific purpose such as a calendar or a calculator application, and is represented in this disclosure by the application 30.

Figure 6B:
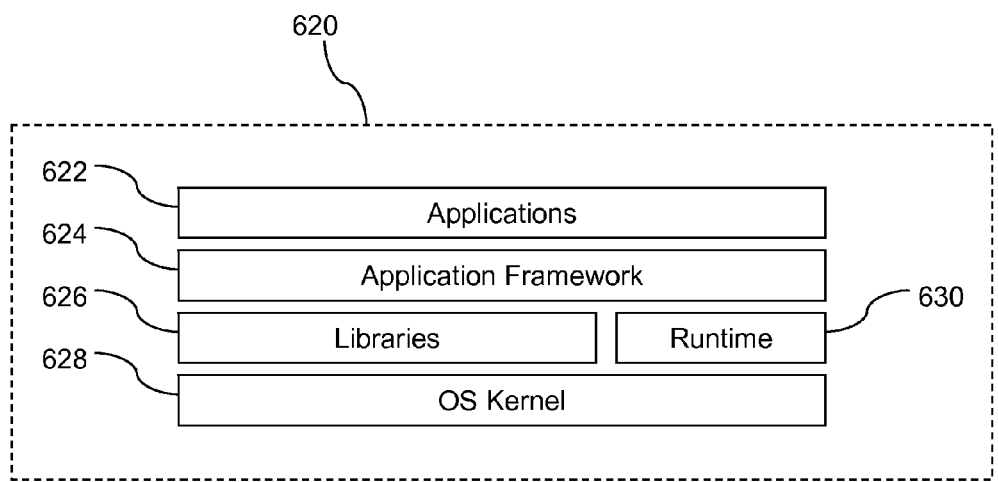
FIG. 6B is a block diagram of another software architecture for a mobile device according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework may rely upon functionality provided via the libraries 626.

Figure 7:
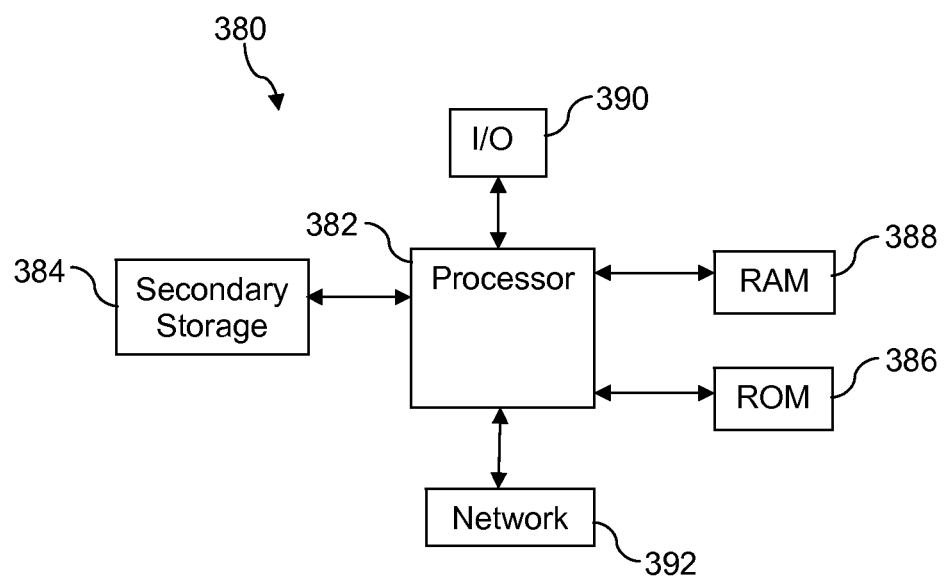
FIG. 7 illustrates an exemplary computer system suitable for implementing the several embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, a baseband signal and/or a signal embodied in a carrier wave may be referred to as a transitory signal. In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of providing privileged access to an electronic device, comprising:
    receiving a first request for an activation code, wherein the first request comprises an identifier of the electronic device;
    determining an activation expiration time by a computer system;
    determining an activation code based on the identifier of the electronic device;
    transmitting the activation code;
    receiving a second request for a token to unlock privileged access to the electronic device, wherein the second request comprises the activation code and the identifier of the electronic device; and
    when the activation code received in the second request correlates with the identifier of the electronic device provided in the second request and when the second request is received before the activation expiration time, transmitting the token to unlock privileged access to the electronic device.

2. The method of claim 1, wherein determining the activation code comprises processing the identifier of the electronic device with a shared private key.

3. The method of claim 1, wherein the activation expiration time is less than two hours.

4. The method of claim 1, wherein transmitting the activation code comprises transmitting the activation code to the electronic device based on the identifier of the electronic device.

5. The method of claim 4, wherein the identifier of the electronic device comprises one of a phone number, an electronic serial number (ESN), or a mobile subscriber identity (MSID).

6. The method of claim 1, further comprising determining if the activation code has been previously used to request the token to unlock privileged access, wherein transmitting the token to unlock privileged access to the electronic device is further conditioned on the absence of a previous use of the activation code.

7. The method of claim 1, further comprising determining an access category based on one of the identifier of the electronic device and an identity of an organization, wherein the token to unlock privileged access identifies the access category.

8. A method of providing privileged access to an electronic device, comprising:
    receiving by the electronic device a first message comprising a uniform resource locator (URL) and an activation code;
    presenting by the electronic device at least a portion of the first message;
    receiving by the electronic device an input selecting the uniform resource locator;
    analyzing by the electronic device the uniform resource locator;
    based on analyzing the uniform resource locator, executing on the electronic device an access mediation application that consumes the uniform resource locator;
    transmitting by the electronic device, the activation code and an identity of the electronic device;
    receiving by the electronic device a second message comprising at least one access permission;
    receiving by the electronic device an input selecting a user interface control; and
    in response to receiving the input selecting the user interface control and based on the at least one access permission, the access mediation application comparing the current time to an expiration time and when the current time is not past the expiration time presenting a user interface control to access privileged functions of the electronic device, wherein the at least one access permission identifies an access category, wherein the access mediation application enables privileged downloading from a computer system external to the electronic device for a first access category, and wherein the access mediation application enables privileged downloading from a media card connected to the electronic device and prohibits privileged downloading from a computer system external to the electronic device for a second access category.

9. The method of claim 8, wherein the electronic device is one of a mobile phone, a personal digital assistant (PDA), and a media player.

10. The method of claim 8, wherein the identity of the electronic device is one of a phone number, an electronic serial number (ESN), and a mobile subscriber identity (MSID).

11. The method of claim 8, further comprising
storing the at least one access permission and the expiration time in a memory of the electronic device; and
when the current time is past the expiration time, deleting the at least one access permission from the memory of the electronic device.

12. The method of claim 11, further comprising encrypting the access permission based on the identity of the electronic device and a shared private key, and wherein storing the access permission in the memory of the electronic device comprises storing the encrypted access permission in the memory of the electronic device.

13. The method of claim 11, wherein the privileged access enables loading an interface and applications pack into the memory of the electronic device, further comprising deleting the contents of the interface and applications pack from the memory when the current time is past the expiration time, wherein the interface and applications pack comprises a self-installation routine and further comprises two or more of a media file, an application, a web widget, and a network service.

14. The method of claim 8, further comprising determining by the electronic device the expiration time after receiving the second message.

15. The method of claim 14, wherein the expiration time is determined based on the access category.

16. The method of claim 8, wherein the second message further comprises the expiration time.

17. A mobile phone, comprising:
an antenna;
a radio transceiver coupled to the antenna;
a processor;
a user interface coupled to the processor;
a memory; and
an application stored in the memory that, when executed by the processor,
receives via the radio transceiver a first message comprising a uniform resource locator (URL) and an activation code,
receives via the user interface an input selecting the uniform resource locator,
analyzes the uniform resource locator,
based on analyzing the uniform resource locator, consumes the uniform resource locator,
transmits via the radio transceiver the activation code and an identity of the mobile phone,
receives via the radio transceiver a second message comprising at least one access permission,
receives via the user interface an input selection;
in response to receiving the input selection and based on the at least one access permission, compares the current time to an expiration time,
when the current time is not past the expiration time presents via the user interface an interface control to access privileged functions of the mobile phone;
saves the at least one access permission in the memory after the second message is received; and
deletes the at least one access permission from the memory when the current time is past the expiration time and the input selection is received.

18. The mobile phone of claim 17, wherein the privileged functions allow loading an interface and applications pack into the memory, wherein the interface and applications pack comprises a self-installation routine and further comprises two or more of a media file, an application, a web widget, and a network service.

\* \* \* \* \*